(12) United States Patent
Mussman et al.

(10) Patent No.: US 7,363,381 B2
(45) Date of Patent: Apr. 22, 2008

(54) ROUTING CALLS THROUGH A NETWORK

(75) Inventors: Harry Edward Mussman, Bedford, MA (US); James D. O'Brien, Jr., Somerville, MA (US); Elliot Eichen, Arlington, MA (US); Lee Goodman, Tyngsboro, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 330 days.

(21) Appl. No.: 10/339,082

(22) Filed: Jan. 9, 2003

(65) Prior Publication Data

US 2004/0139209 A1    Jul. 15, 2004

(51) Int. Cl.
*G06F 15/16* (2006.01)

(52) U.S. Cl. .............. 709/230; 709/203; 709/232; 709/238; 709/249; 370/356; 370/467

(58) Field of Classification Search ............. 709/230, 709/232, 238, 249, 203; 370/352, 356, 466–467, 370/252, 256
See application file for complete search history.

(56) References Cited

U.S. PATENT DOCUMENTS

| 4,991,204 | A | 2/1991 | Yamamoto et al. |
| 5,956,339 | A | 9/1999 | Harada et al. |
| 6,067,545 | A | 5/2000 | Wolff |
| 6,366,576 | B1 | 4/2002 | Haga |
| 6,442,268 | B1 * | 8/2002 | Klaghofer et al. ......... 379/229 |
| 6,490,275 | B1 * | 12/2002 | Sengodan ................. 370/356 |
| 6,510,219 | B1 | 1/2003 | Wellard et al. |
| 6,567,398 | B1 * | 5/2003 | Aravamudan et al. ...... 370/352 |
| 6,577,648 | B1 | 6/2003 | Raisanen et al. |
| 6,581,104 | B1 | 6/2003 | Bereiter |
| 6,600,735 | B1 * | 7/2003 | Iwama et al. ............. 370/352 |
| 6,614,781 | B1 | 9/2003 | Elliott et al. |
| 6,628,617 | B1 | 9/2003 | Karol et al. |
| 6,674,745 | B1 * | 1/2004 | Schuster et al. ........... 370/352 |
| 6,674,758 | B2 | 1/2004 | Watson |
| 6,687,245 | B2 | 2/2004 | Fangman et al. |
| 6,718,359 | B2 | 4/2004 | Zisapel et al. |
| 6,731,642 | B1 * | 5/2004 | Borella et al. ............ 370/401 |
| 6,738,390 | B1 * | 5/2004 | Xu et al. .................. 370/467 |
| 6,766,377 | B1 | 7/2004 | Grabelsky et al. |

(Continued)

FOREIGN PATENT DOCUMENTS

EP    0 966 145    6/1999

(Continued)

OTHER PUBLICATIONS

R. Ackermann et al., "An Open Source H.323-SIP Gateway as Basis for Supplementary Service Internetwork", Darmstadt University of Technology Industrial Process and System Communications (KOM), 2001.*

(Continued)

*Primary Examiner*—Oanh Duong
(74) *Attorney, Agent, or Firm*—Hensley Kim & Holzer, LLC

(57) ABSTRACT

Routing calls through networks includes a device configured to support a first protocol for initiation, maintenance, and termination of a communication session between call endpoints, and to support a second protocol for resolving endpoint addresses for the communication session.

47 Claims, 9 Drawing Sheets

U.S. PATENT DOCUMENTS

| | | |
|---|---|---|
| 6,798,751 B1 | 9/2004 | Voit et al. |
| 6,798,786 B1 | 9/2004 | Lo et al. |
| 6,801,540 B1 * | 10/2004 | Jeong ............................ 370/466 |
| 6,822,957 B1 | 11/2004 | Schuster et al. |
| 6,829,250 B2 | 12/2004 | Voit et al. |
| 6,917,612 B2 * | 7/2005 | Foti et al. .................... 370/352 |
| 6,922,786 B1 | 7/2005 | Ong |
| 6,965,562 B2 | 11/2005 | Tuomi |
| 6,973,042 B1 | 12/2005 | Fitzgerald |
| 7,016,343 B1 * | 3/2006 | Mermel et al. ............. 370/356 |
| 7,047,561 B1 | 5/2006 | Lee |
| 7,075,922 B2 | 7/2006 | Mussman et al. |
| 7,215,643 B2 | 5/2007 | Mussman et al. |
| 7,239,629 B1 * | 7/2007 | Olshansky et al. ......... 370/353 |
| 2001/0046234 A1 * | 11/2001 | Agrawal et al. ............. 370/402 |
| 2002/0122547 A1 | 9/2002 | Hinchey et al. |
| 2003/0031166 A1 * | 2/2003 | Saller ......................... 370/352 |
| 2003/0059005 A1 | 3/2003 | Meyerson et al. |
| 2003/0091024 A1 | 5/2003 | Stumer |
| 2003/0095541 A1 | 5/2003 | Chang et al. |
| 2003/0118006 A1 | 6/2003 | Yang et al. |
| 2004/0028035 A1 * | 2/2004 | Read ........................... 370/352 |
| 2004/0066927 A1 * | 4/2004 | Horvath et al. ........ 379/210.01 |
| 2004/0179515 A1 | 9/2004 | Kamani et al. |
| 2005/0021820 A1 * | 1/2005 | Leis et al. .................. 709/232 |

FOREIGN PATENT DOCUMENTS

| | | |
|---|---|---|
| EP | 1 035 719 | 9/2000 |
| EP | 1 089 535 | 9/2000 |
| EP | 1 014 633 | 9/2004 |
| WO | WO 98/59467 A2 * | 12/1998 |
| WO | WO 99/14931 | 3/1999 |
| WO | WO 00/75744 | 12/2000 |
| WO | WO 01/05115 | 1/2001 |

OTHER PUBLICATIONS

Loa et al.; "Enhanced H.323 Gateway with IVR Agent and H.323 Gatekeeper"; Technical Developments; Sep. 1999; pp. 120-123; Motorola, Inc.

Pearlman et al.; "Alternate Path Routing in Mobile Ad Hoc Networks"; IEEE MILCOM; Oct. 2000; pp. 1-6; Los Angeles, CA.

"Accelerating the Deployment of VoIP and VoATM"; Web ProForum Tutorials (www.iec.org); pp. 1-21; The International Engineering Consortium, date unknown.

"Gatekeeper"; Web ProForum Tutorials (www.iec.org); pp. 1-15; The International Engineering Consortium, date unknown.

* cited by examiner

ROUTING CALLS THROUGH A NETWORK

BACKGROUND

This invention relates to routing calls through a network.

Devices can communicate multimedia information such as sounds, video, data, and other types of similar information in real time over a network using a protocol such as Session Initiation Protocol (SIP) or H.323 (International Telecommunications Union (ITU) standard approved in 1996, H.323 version two approved in January 1998). The network may be a packet-based network, such as an Internet Protocol (IP) network. SIP and H.323 can each enable functions such as call routing, call signaling, capabilities exchange, media control, and other similar functions. SIP and H.323 are each described further below.

SIP is a signaling protocol that can facilitate initiation, maintenance, and termination of a communication session between SIP user agents, SIP software included in or accessible by a device. A SIP user agent (called a client when sending a request) can send a communication session request to another user agent (called a server when receiving and responding to a request) over an IP network. SIP can enable the client and the server to agree upon characteristics of the communication session, such as service policies, media types, etc.

H.323 defines a set of standards that may be used in communicating multimedia information between telephony and IP networks and enabling calls to be routed, controlled, and transported by an IP network. A client and a server may use H.323 standards in initiating, maintaining, and terminating a communication session.

Clients and servers with H.323 capability typically use four main components: terminals, gateways, gatekeepers, and multipoint control units (MCUs). Terminals generally include applications running at the endpoints of the communication session, e.g., at the client(s) and the server(s) involved in a communication session. Gateways generally include mechanisms that enable clients to communicate with non-H.323 devices by translating between different communication services, transmission policies, coding/decoding procedures, and other similar operations. Gatekeepers generally include mechanisms that provide network services such as bandwidth control, call control, address translation, and other similar services to terminals, gateways, and MCUs. MCUs generally include mechanisms that enable multiple terminals to participate in a single communication session.

Referring to FIG. 1, for example, a network configuration 100 illustrates a sample of a call setup from a terminal with an H.323 endpoint 108 to an H.323 gateway 110 included in an H.323 network 104. Thus, in this example, the terminal 108 represents the client and the gateway 110 represents the server. The call starts as the terminal with an H.323 endpoint 108 sends an address request directed to a gatekeeper 112 included in the H.323 network 104, seeking to find the IP address of H.323 gateway 110. The address request is transmitted over an IP network 114.

The ingress gatekeeper 112 communicates with a directory and egress gatekeeper 106 included in the H.323 network 104 using a protocol used to route calls to available resources through the IP network 114 such as registration, admission, and status (RAS).

The ingress gatekeeper 112 may send a location request to the egress gatekeeper 106. The egress gatekeeper 106 may respond with a location confirmation indicating the IP address of H.323 gateway 110. The ingress gatekeeper 112 may send an address confirmation to the terminal 108 that the terminal 108 may accept to begin communications with the gateway 110. The terminal 108 can communicate with the gateway 110 using a call control mechanism such as the H.245 standard (ITU H.245 standard recommended in February 2000) and a channel or packet transfer mechanism such as the H.225 standard (ITU H.225.0 standard recommended in November 2000). H.245 and H.225 are typically used for call control operations such as setup, teardown, redirection, and other similar operations. After any call control operations, the terminal 108 and the gateway 110 can communicate in a real-time transport protocol (RTP) or real-time transport control protocol (RTCP) communication session.

The client(s) and server(s) that desire to establish a communication session may not all be enabled with the same communication protocol.

FIG. 2 illustrates a sample of a call setup between a terminal 116 with a SIP user agent and the H.323 gateway 110 in H.323 network 104, that now includes Ingress SIP proxy 112 and a SIP to H.323 protocol converter 122 to provide SIP to H.323 protocol conversion. First, a SIP call is setup between the terminal with SIP user agent 116 and the SIP to H.323 protocol converter 122, and then an H.323 call is setup between the SIP to H.323 protocol converter 122 and the H.323 gateway 110.

SUMMARY

According to an aspect of the present invention, an apparatus includes a device configured to support a first protocol for initiation, maintenance, and termination of a communication session between call endpoints, and to support a second protocol for resolving endpoint addresses for the communication session.

According to another aspect of the present invention, a system includes a proxy device configured to route calls using an International Telecommunications Union (ITU) multimedia information protocol and calls using a first protocol for initiation, maintenance, and termination of a communication session between endpoints using a second protocol for initiation, maintenance, and termination of a communication session and a third protocol for resolving endpoint addresses for the communication session.

According to another aspect of the present invention, a method and an article comprising a machine-readable medium which contains machine-executable instructions, the instructions causing a machine to perform includes receiving a call setup message from a first call endpoint at a first gatekeeper included in a first network, forwarding the call setup message from the first gatekeeper to a device included in a second network, the device capable of handling session initiation protocol (SIP) call setup messages and handling registration, admission, and status (RAS) messages, sending a RAS message from the device to a second gatekeeper included in a third network, receiving at the device from the second gatekeeper RAS address information for a second call endpoint, and setting up a call between the first call endpoint and the second call endpoint.

According to another aspect of the present invention, an apparatus includes a session initiation protocol (SIP) device configured to use a registration, admission, and status (RAS) protocol in routing a call across multiple protocols and between two endpoints included in two different networks.

According to another aspect of the present invention, a system includes a proxy device configured to route calls using an International Telecommunications Union (ITU)

multimedia information protocol and calls using a first protocol for initiation, maintenance, and termination of a communication session between endpoints using a second protocol for initiation, maintenance, and termination of a communication session and a third protocol for resolving endpoint addresses for the communication session and configured to redirect call messages, and a second proxy device configured to receive redirected call messages from the proxy device and to route redirected calls using an International Telecommunications Union (ITU) multimedia information protocol and calls using a first protocol for initiation, maintenance, and termination of a communication session between endpoints using a second protocol for initiation, maintenance, and termination of a communication session and a third protocol for resolving endpoint addresses for the communication session.

One or more of the following advantages may be provided by one or more aspects of the invention.

Network infrastructures that use RAS as a protocol to route H.323 calls (or improvements to or extensions of H.323) can be adapted to also route SIP calls. In this way, the network infrastructures can use the features and functions of both RAS and SIP and enable a single network infrastructure to deliver a call based upon either the H.323 protocol or the SIP protocol. The network infrastructure may thereby incur lower capital costs, have higher network utilization, and/or re-use existing back office systems and processes.

Other advantages and features will become apparent from the following description and from the claims.

DETAILED DESCRIPTION

Figure 1:
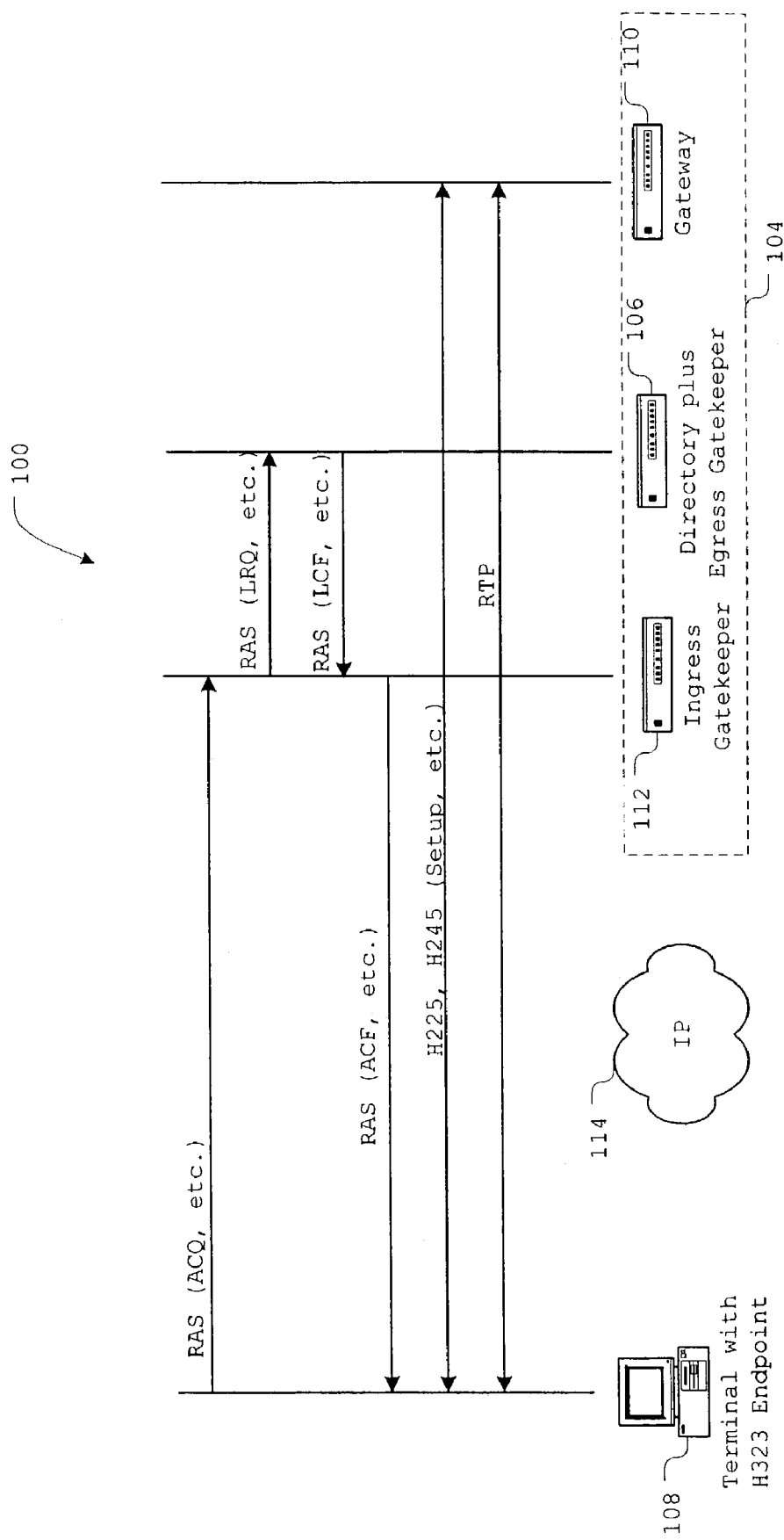
FIG. 1 (PRIOR ART) shows a call setup in a network configuration from an H.323 endpoint to an H.323 server.
Figure 2:
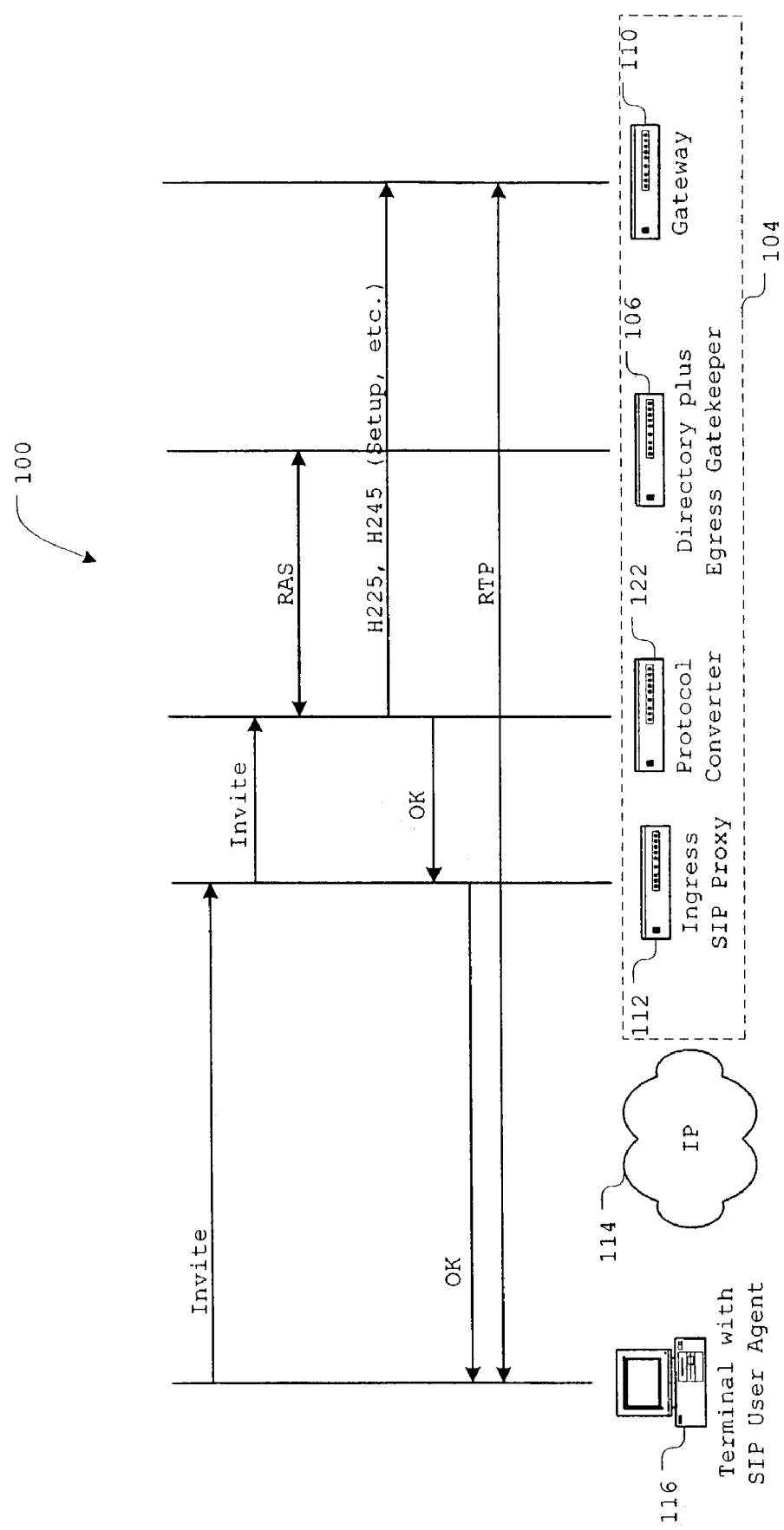
FIG. 2 (PRIOR ART) shows a call setup in a network configuration from a SIP endpoint to an H.323 server.
Figure 3:
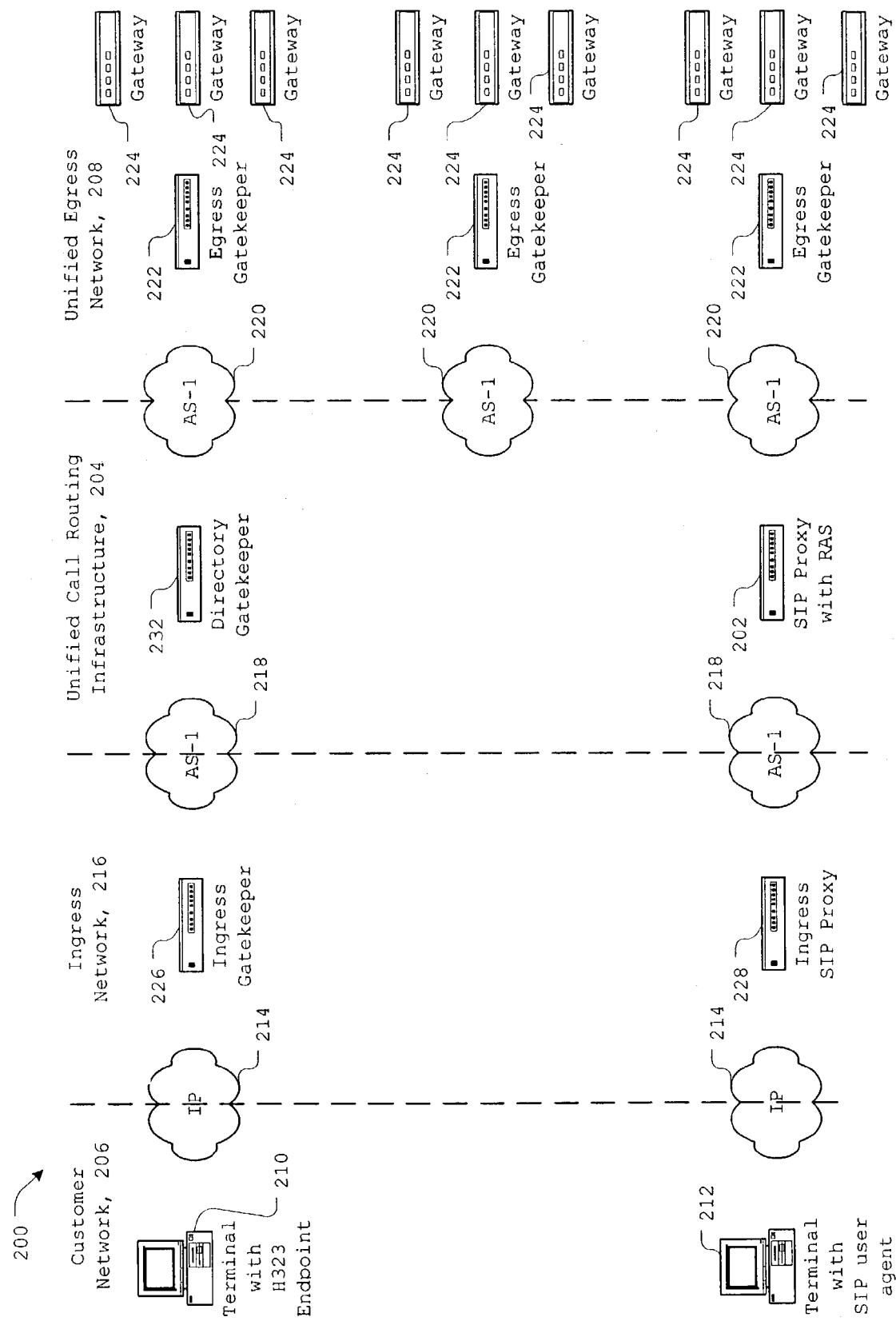
FIG. 3 illustrates an example network configuration.

Referring to FIG. 3, an example network configuration 200 includes a unified SIP/H.323 call routing infrastructure 204 that includes a SIP proxy 202 that employs the RAS protocol to resolve endpoint addresses in routing a call. Because the SIP proxy 202 includes RAS messaging capabilities, the unified SIP/H.323 call routing infrastructure 204 can support two different protocols, SIP and H.323, in routing a call between a customer network 206 and a unified egress network 208, where routing can include setting up, controlling, and/or maintaining the call. Furthermore, gateways 224 included in the egress network 208 can be responsive to H.323 and SIP calls on a call by call basis.

Generally, in setting up a call, an end user included in the customer network 206 sends a call request message across a first IP network 214 to an ingress network 216. The end user may support H.323, as does a H.323 client terminal 210, or the end user may support SIP, as does a SIP client terminal 212. The ingress network 216 supports both H.323 requests using an ingress gatekeeper 226 and SIP requests using an ingress SIP proxy 228. The ingress network 216 forwards the call request message across an autonomous system (AS) network 218 to the unified call routing infrastructure 204, including both a directory gatekeeper 232 and the SIP proxy with RAS 202.

Figure 4:
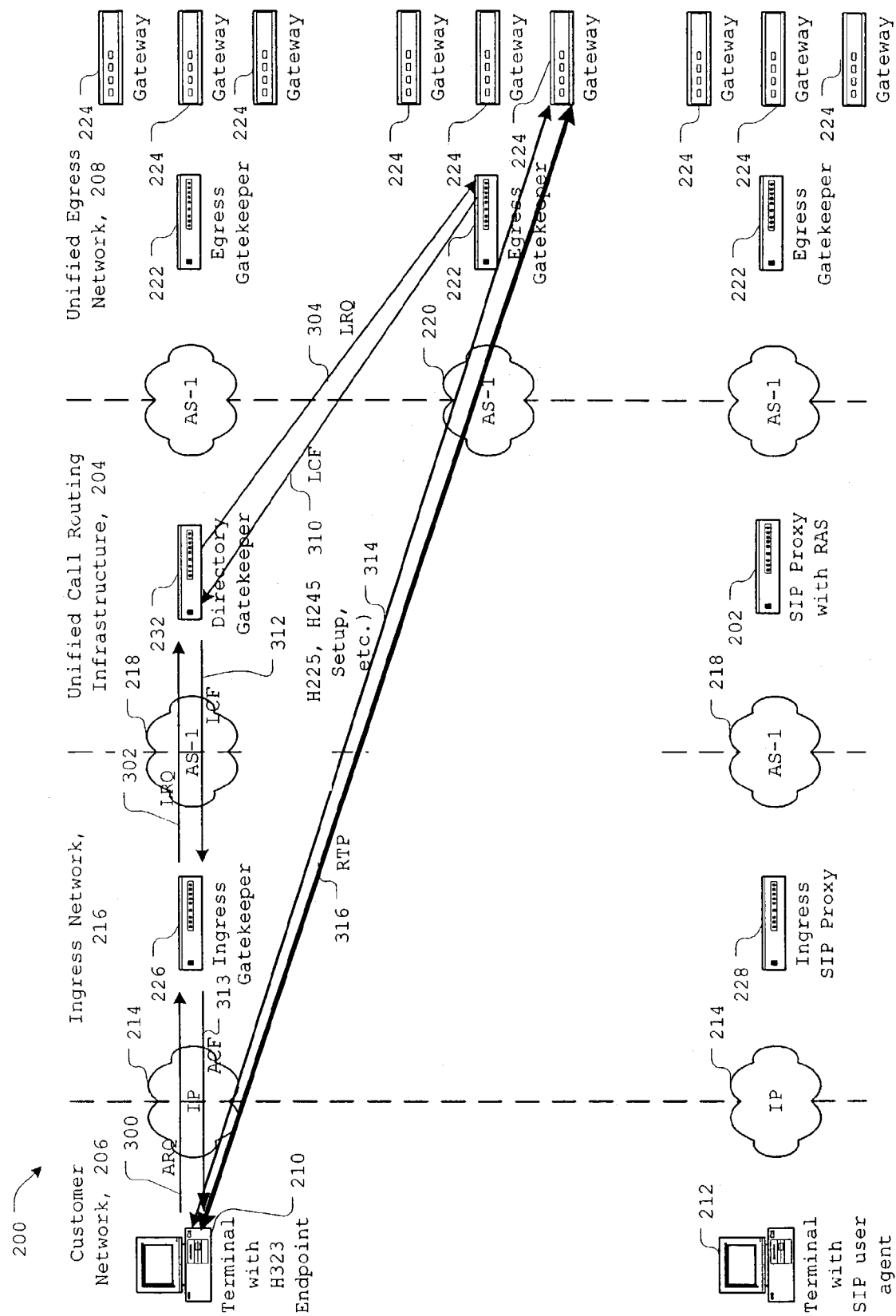
FIG. 4 illustrates an example of an H.323 call made through a SIP/H.323 network.

FIG. 4 shows a simplified example of an H.323 call made in the network configuration 200 of FIG. 3. Controlling the H.323 call through the unified SIP/H.323 call routing infrastructure 204 includes routing the H.323 call (including performing address resolution), setting up the H.323 call, and flowing information between the H.323 call's endpoints.

In routing the H.323 call, the H.323 client terminal 210 sends 300 a ARQ request across the first IP network 214 to the ingress network 216. A server included in the ingress network 216 that is capable of handling H.323 messages, the ingress gatekeeper 226 in this example, receives the invite request and forwards 302 the location request across the AS network 218 to the SIP/H.323 unified call routing infrastructure 204. The H.323 directory gatekeeper 232 included in the unified SIP/H.323 call routing infrastructure 204 receives the invite request and forwards 304 the location request to the egress gatekeeper 222. The H/323 gatekeeper 232 is shown as separate from the SIP proxy 202 in this example, but the H.323 directory gatekeeper 232 and the SIP proxy 202 may be one gatekeeper mechanism or be considered a generalized gatekeeper infrastructure.

The gatekeeper 222 uses RAS to translate the alias or local address of the gateway 224 that the H.323 client terminal 210 desires to communicate with into an IP address. Typically, the gatekeeper 222 performs such address translation using a table associating aliases and local addresses with IP addresses. The gatekeeper 222 can also perform other RAS-enabled functions such as bandwidth control and zone admissions authorization. The egress gatekeeper 222 notifies 310 the H.323 gatekeeper 232 of the addressing information, and the H.323 gatekeeper 232 forwards 312 this information to the ingress gatekeeper 226 which sends 313 address confirmation information to the terminal 210.

The terminal 210 may then set up 314 the H.323 call with the appropriate gateway 224, the gateway identified in the call setup message. Once the H.323 call is set up, information can flow 316 between the H.323 client terminal 210 and the gateway 224.

The terminal 210 may not desire to communicate with any particular one of the gateways 224 but with any one of the gateways 224 that has a particular capability or set of capabilities. The egress gatekeepers 222 and/or the gateways 224 may each have an associated technology prefix that can help select a gateway 224 having the capability or capabilities desired by the terminal 210. A technology prefix (also called a routing index) generally refers to an identifier at the beginning of an address associated with a gateway that distinguishes the gateway as having a particular capability or capabilities within the network (or zone) including the gateway, in this example in the unified egress network 208.

In the exchange between the gateways 224 and the egress gatekeeper 222, technology prefixes may be used to select a gateway 224. Technology prefixes can be used to tell the egress gatekeeper 222 that a certain technology is associated with a particular call (for example, 15# could mean a fax transmission), or technology prefixes can be used like an area code for more generic routing. No standard defines what the numbers in a technology prefix mean; typically, technology prefixes are designated by a pound symbol (#) as the last character. For example, the terminal 210 may dial a number, such as "202-555-1234," that translates to a local extension, such as "5534," or it may dial a different number, such as "202-556-1234," that translates to the same local extension through a gateway with facsimile transmission capabilities by adding a technology prefix, such as "15#5534".

Technology indexes may also be used to indicate a particular gatekeeper to be used to complete a call. For example, a dialed number "202-555-1234" may be translated to "4#202-555-1234" indicating that a particular gatekeeper in the egress network 208 servicing a customer in the customer network 206 corresponding to the dialed number will be used to complete the call.

Figure 5:
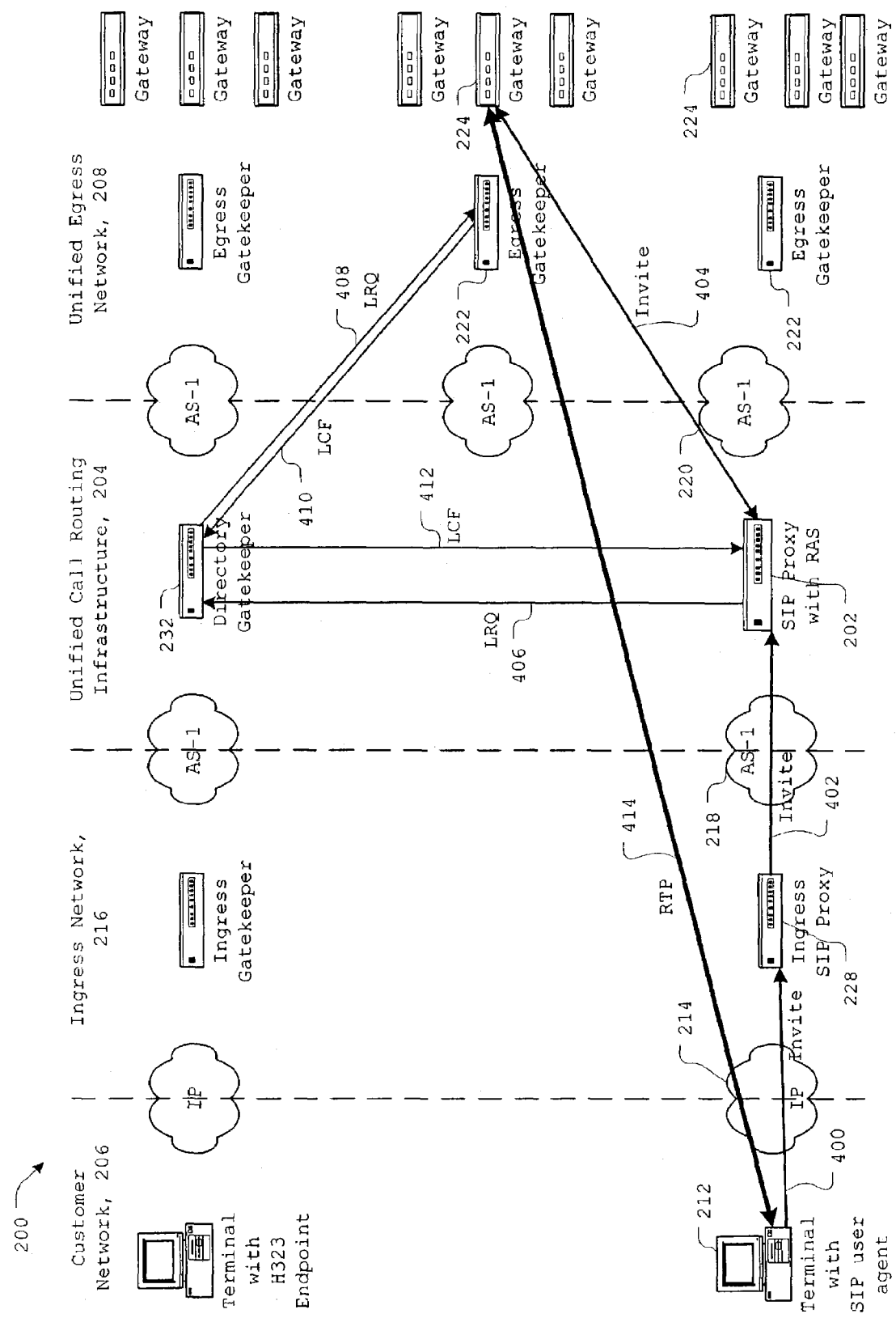
FIG. 5 illustrates an example of a SIP call made through a SIP/H.323 network.

FIG. 5 shows a simplified example of a SIP call made in the network configuration 200 of FIG. 3. Call routing in FIG. 5 is similar to that described for FIG. 4 and includes controlling the SIP call through the unified SIP/H.323 call routing infrastructure 204, routing the SIP call (including performing address resolution), setting up the SIP call, and flowing information between the SIP call's endpoints.

In setting up the SIP call, the SIP client terminal 212 sends 400 an invite request across the first IP network 214 to the ingress network 216. The customer proxy server 228 included in the ingress network 216 and capable of handling SIP messages receives the invite request. The customer proxy server 228 forwards 402 the invite request across the AS network 218 to the SIP/H.323 unified call routing infrastructure 204. The SIP proxy 202 included in the unified SIP/H.323 call routing infrastructure 204 receives the invite request and forwards 404 the invite request across the second AS network 220 to the appropriate gateway 224 included in the egress network 208.

The appropriate gateway 224 is identified through call routing (address resolution), similar to the call routing described above with reference to FIG. 4. Before forwarding the invite request to the appropriate gateway 224, the home SIP proxy 202 forwards 406 the location request to the directory gatekeeper 232. The directory gatekeeper 232 then forwards a location request to egress gatekeeper 222.

The egress gatekeeper infrastructure 222 included in the egress network 208 returns 410 the IP addressing information for a gateway 224 or endpoint included in the egress network 208 in a confirm message to directory gatekeeper 232, which in turn returns 412 the IP address information in a confirm message to SIP proxy 202.

The SIP proxy 202 has two options in completing the call setup: direct network proxy or redirect network proxy. With the direct network proxy option, the SIP proxy 202 forwards the call setup message directly to the terminating gateway 224 identified by the egress network 208. With the redirect network proxy option, the SIP proxy 202 sends the call setup message back to the ingress network 216, which redirects the call setup message to the terminating gateway 224 identified by the egress network 208. Each of these options is described further below. Finally, information may flow 414 between the SIP client terminal 212 and the appropriate gateway 224.

Figure 6:
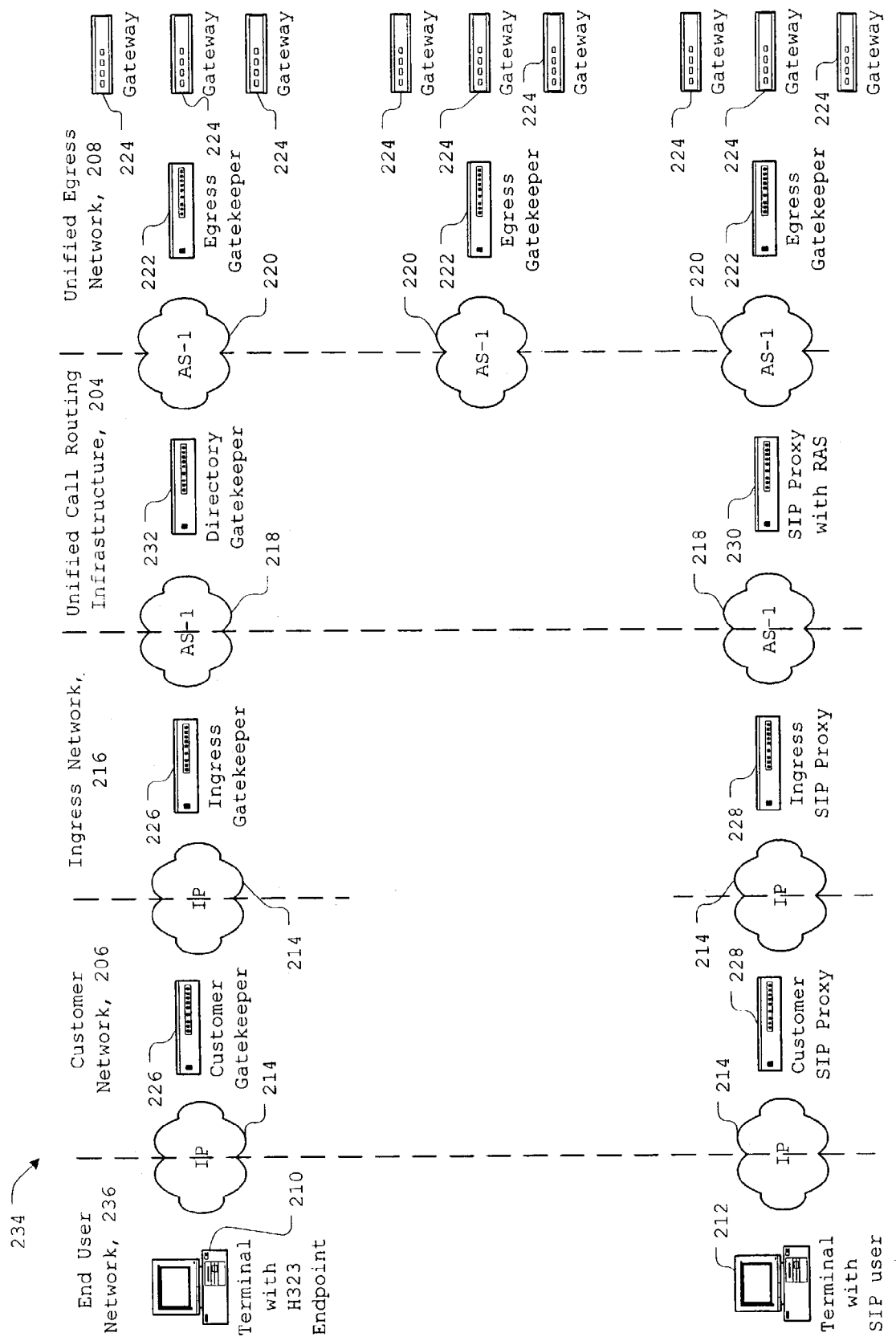
FIG. 6 illustrates another example network configuration.

FIG. 6 shows another example network configuration 234 that is a variation of the network configuration 200 of FIG. 3 and that includes an end user network 236 separate from the customer network 216. Messaging in the network configuration 234 is similar to that described for the network configuration 200 but takes into account extra messaging that takes place between the customer network 216 and the end user network 236 in setting up a call between the end user network 236 and the egress network 208.

Before further discussing the direct network proxy option, the redirect proxy option, and other aspects of the network configurations 200 and 234, the elements in the example network configurations 200 and 234 are further described.

The elements in the network configurations 200 and 234 can be implemented in a variety of ways. Information (data) communicated between the customer network 206 or the end user network 236 and the egress network 208 once a call is set up can include data, instructions, or a combination of the two. The information may be in packets. Each sent packet may be part of a packet stream, where each of the packets included in the packet stream fits together to form a timewise contiguous stream of data. Information may be communicated between endpoints via multicast, unicast, or some combination of both. Examples of types of information that may be communicated between the endpoints using H.323 and/or SIP include multimedia information such as sounds (including voice signals), video, and other similar information. H.323 and SIP may each communicate any combination of such information types at any given time. Examples of endpoint applications that may use an H.323 infrastructure and/or a SIP infrastructure include audio streaming, video streaming, Internet telephony, videoconferencing, collaborative computing, conference calling, distance learning, support and help desk applications, interactive shopping applications, and other similar applications.

The ingress network 216 may be provided by an application service provider (ASP). An ASP hosts applications on its own servers within its own facilities. Customers (e.g., end users in the customer network 206) may access the applications via private lines or a public network such as the Internet (e.g., the IP network 214).

The IP network 214 can include any kind and any combination of networks such as an Internet, a local network, a private network, a public network, or other similar network. Communications through the IP network 214 may be secured with a mechanism such as Transport Layer Security/Secure Socket Layer (TLS/SSL), wireless TLS (WTLS), or secure Hypertext Transfer Protocol (S-HTTP).

The AS networks 218 and 220 can include any kind of AS network. AS networks generally include single or multiple protocol networks administered by a single set of management rules overseen by one entity.

The terminals 210 and 212 can each include any device capable of communicating with the IP network 214. Examples of such devices include a mobile computer, a stationary computer, a server, a telephone, a pager, a personal digital assistant, and other similar devices.

The SIP proxy 202 can include any device capable of communicating using SIP with RAS capabilities such as a devoted proxy server, a file server, a mobile computer, a stationary computer, or other similar device. The SIP proxy 202 can include any device capable of using SIP and communicating with the IP networks 214 and the AS networks 218 and 220 such as a devoted proxy server, a file server, a mobile computer, a stationary computer, or other similar device.

The gatekeepers 222 can each include devoted gatekeeper devices, servers with gatekeeping functionality, or other similar devices.

The gateways 224 can each include any device or mechanism capable of communicating with their associated gatekeeper 222. Examples of the gateways 224 include devoted gateway devices, computers, proxy servers, virtual private network gateways, Realm Specific Internet Protocol (RSIP) gateways, or other similar devices.

The ingress gatekeeper 226 can include any device capable using H.323 and communicating with the IP network 214 and the AS networks 218 and 220 such as a file server, a mobile computer, a stationary computer, or other similar device.

The SIP proxy 202 can communicate with the customer SIP proxy 228. The SIP proxy 202 can include any device capable of using SIP and communicating with the SIP proxy 202, the AS network 218, and the second AS network 220 such as a devoted proxy server, a file server, a mobile computer, a stationary computer, or other similar device.

The H.323 gatekeeper 232 can communicate with the ingress gatekeeper 226 and the SIP proxy 202. The H.323 gatekeeper 232 can include a devoted gatekeeper device, a server with gatekeeping functionality, or other similar device.

Elements included in the network configurations 200 and 234 communicate with other element(s) included in the network configurations 200 and 234, respectively, over one or more communication links. These communication links can include any kind and any combination of communication links such as modem links, Ethernet links, cables, point-to-point links, infrared connections, fiber optic links, wireless links, cellular links, Bluetooth, satellite links, and other similar links.

Furthermore, the network configurations 200 and 234 are simplified for ease of explanation. The network configurations 200 and 234 may each include more or fewer additional elements such as networks, communication links, proxy servers, firewalls, or other security mechanisms, Internet Service Providers (ISPs), MCUs, gatekeepers, gateways, and other elements.

Figure 7:
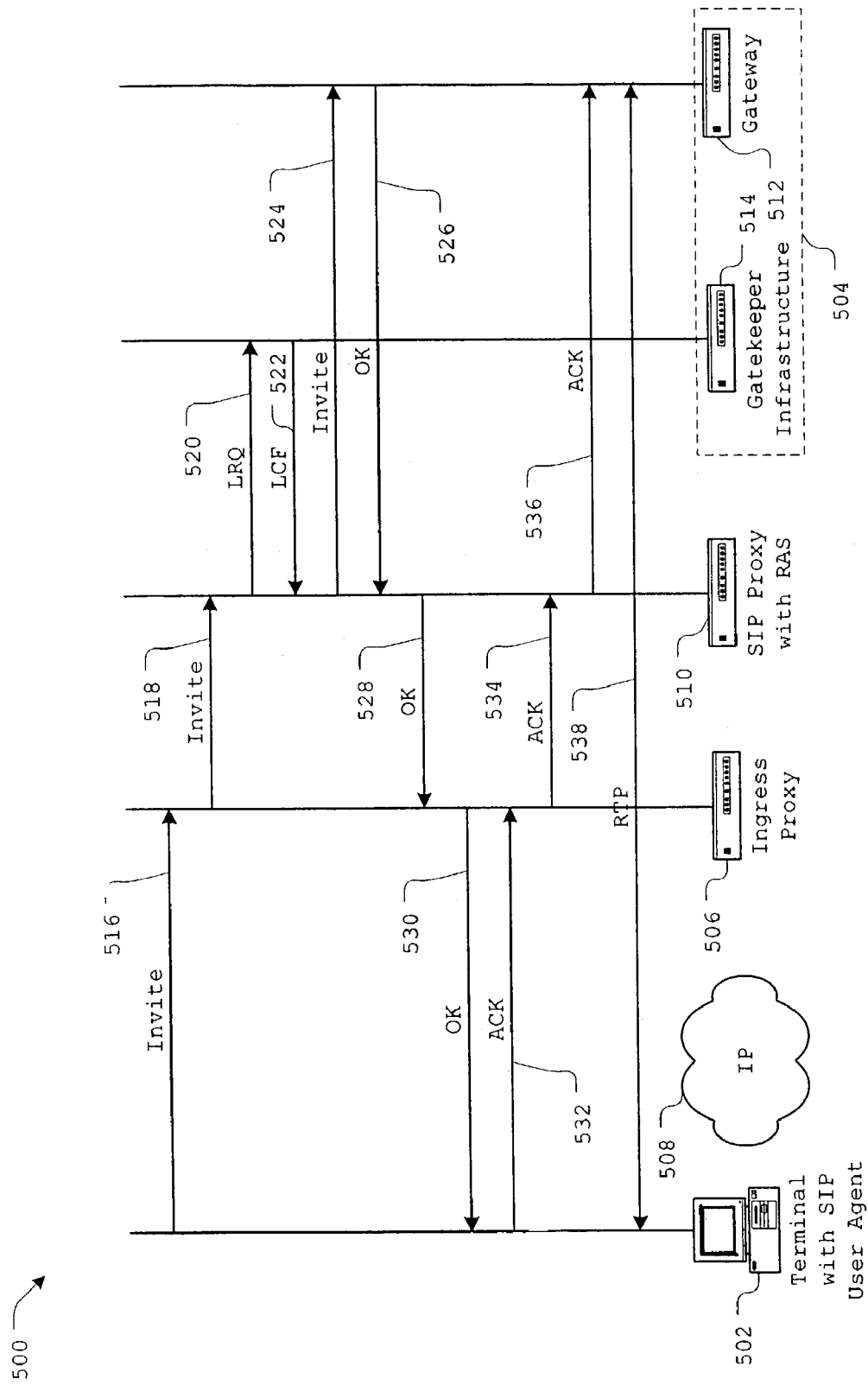
FIGS. 7 and 8 show example call setups using direct network proxies.

Referring to FIG. 7, an example of a direct network proxying process 500 is shown. Generally, in this example direct network proxying process 500, a terminal with a SIP user agent 502 (e.g., an endpoint) initiates a call with an end network 504 by sending a SIP invite request to the end network 504 over a network 508. The SIP invite request traverses through an ingress proxy 506, and a network SIP proxy with RAS capabilities 510 ("network proxy 510") en route to the end network 504. The terminal 502 and the end network 504 are both capable of supporting H.323 or SIP, but their call routing infrastructures are based on H.323. The network proxy 510 uses RAS to resolve the IP address of a gateway 512 included in the end network 504 against the end network's H.323 gatekeeper infrastructure 514 and forwards the SIP invite request directly to the gatekeeper 514. The gatekeeper infrastructure 514 may include directory and egress gatekeeper capabilities. The gatekeeper 514 can forward the SIP invite request directly to the gateway 512, which can then acknowledge the SIP invite request to the terminal 502 and complete the call setup. There need not be any H.225 or H.245 signaling involved in setting up the call.

Call setup signals transmitted between elements shown in FIG. 7 are shown in chronological order from top (earliest signal) to bottom (latest signal). Each signal's directional arrow indicates the start and end points of each signal.

The example direct network proxying process 500 begins with the terminal 502 sending a SIP invite request signal 516 ("invite signal 516") to the ingress proxy 506. The ingress proxy 506 forwards a second invite signal 518 across the network 508 to the network proxy 510. The second invite signal 518 may be identical to or modified from the invite signal 516, e.g., modified to include additional routing information.

The network proxy 510 then routes the call, e.g., resolves the address of the call's terminating gateway, the gateway 512. The network proxy 510 can be either a non-stateful proxy, in which the network proxy 510 forwards SIP messages and then forgets about the messages, or a stateful proxy in which the network proxy 510 retains an association between the unique call identifier and the SIP session.

The network proxy 510 sends a location request (LRQ) signal 520 to the gatekeeper infrastructure 514 to try to resolve the gateway's alias address. The network proxy 510 may resolve the address in other ways, either before or after or in addition to or in place of sending the LRQ signal 520. As one example, the network proxy 510 may send a RAS address request (ARQ) signal to the gatekeeper infrastructure in an attempt to resolve the gateway's alias address.

The gatekeeper infrastructure 514 responds to the LRQ signal 520 with a location confirmation (LCF) signal 522. The LCF signal 522 includes contact information for the gateway 512 or for the gatekeeper included in the gatekeeper infrastructure 514 and associated with the gateway 512. Typically, the gatekeeper associated with the gateway 512 (e.g., the gatekeeper that the gateway 512 is registered with) returns the LCF signal 522 to the network proxy 510. Any other gatekeepers included in the gatekeeper infrastructure 514 that receive the LRQ signal 520 may each return a location reject (LRJ) signal to the network proxy 510 indicating that the call's endpoint is not registered with it.

Now knowing address information for the call's endpoint, the terminating gateway 512, the network proxy 510 sends a third invite signal 524 to the gateway 512. The gateway 512 responds by sending an OK signal 526 to the network proxy 510. The OK signal 526 acknowledges that the gateway 512 can participate in a call with the other SIP endpoint, the terminal 502 in this example. If the gateway 512 cannot or will not accept the third invite request 524, then the gateway 512 may not send the OK signal 526 but rather send an invite refusal or invite denial signal such as a location reject (LRJ) signal. If the gateway 512 does not send the OK signal 526 or otherwise refuses the call, then the call is not setup, and the network proxy 510 may send appropriate notification to the terminal 502.

If the gateway 512 sends the OK signal 526, then the SIP user agent 502 should be informed that the gateway 512 can accept the SIP call agent's invite request. The network proxy 510 sends a second OK signal 528 to the ingress proxy 506. The second OK signal 528 may be the same as or modified from the OK signal 526. The ingress proxy 506 transmits a third OK signal 530 (which may be the same as or modified from the second OK signal 528) to the terminal 502.

Once the terminal 502 receives an acknowledgement that the gateway 512 can participate in a call with the terminal 502 (e.g., receives the third OK signal 530), the terminal 502 sends an acknowledgment (ACK) signal 532 to the gateway 512. The ACK signal 532 encounters the ingress proxy 506 which sends a second ACK signal 534 (identical or similar to the ACK signal 532) across the network 508 to the network proxy 510. The network proxy 510 sends a third ACK signal 536 (identical or similar to the second ACK signal 534) to the gateway 512.

Once the call is acknowledged between the call's endpoints, the terminal 502 and the gateway 512 can communicate information in an RTP communication session 538 such as an RTCP communication session or a real-time streaming protocol (RTSP) communication session. RTP generally refers to an Internet protocol for communicating real-time data such as multimedia information over the Internet. A call may be set up, however, using a process similar to the direct network proxying process 500 across a network or networks other than the Internet.

The direct network proxy option may also be implemented using a SIP proxy with RAS messaging on the inbound side of a network. In such a case, a call may be made from a public switched telephone network (PSTN) and directed to a SIP application or to a gateway connecting one PSTN to another PSTN via SIP. The PSTN may also be called a plain old telephone service (POTS). The SIP proxy on the inbound side of the network responds to a RAS request made from the outbound side of the network with an LCF signal or a LRJ signal as well as with a location request (LCR) signal.

Figure 8:
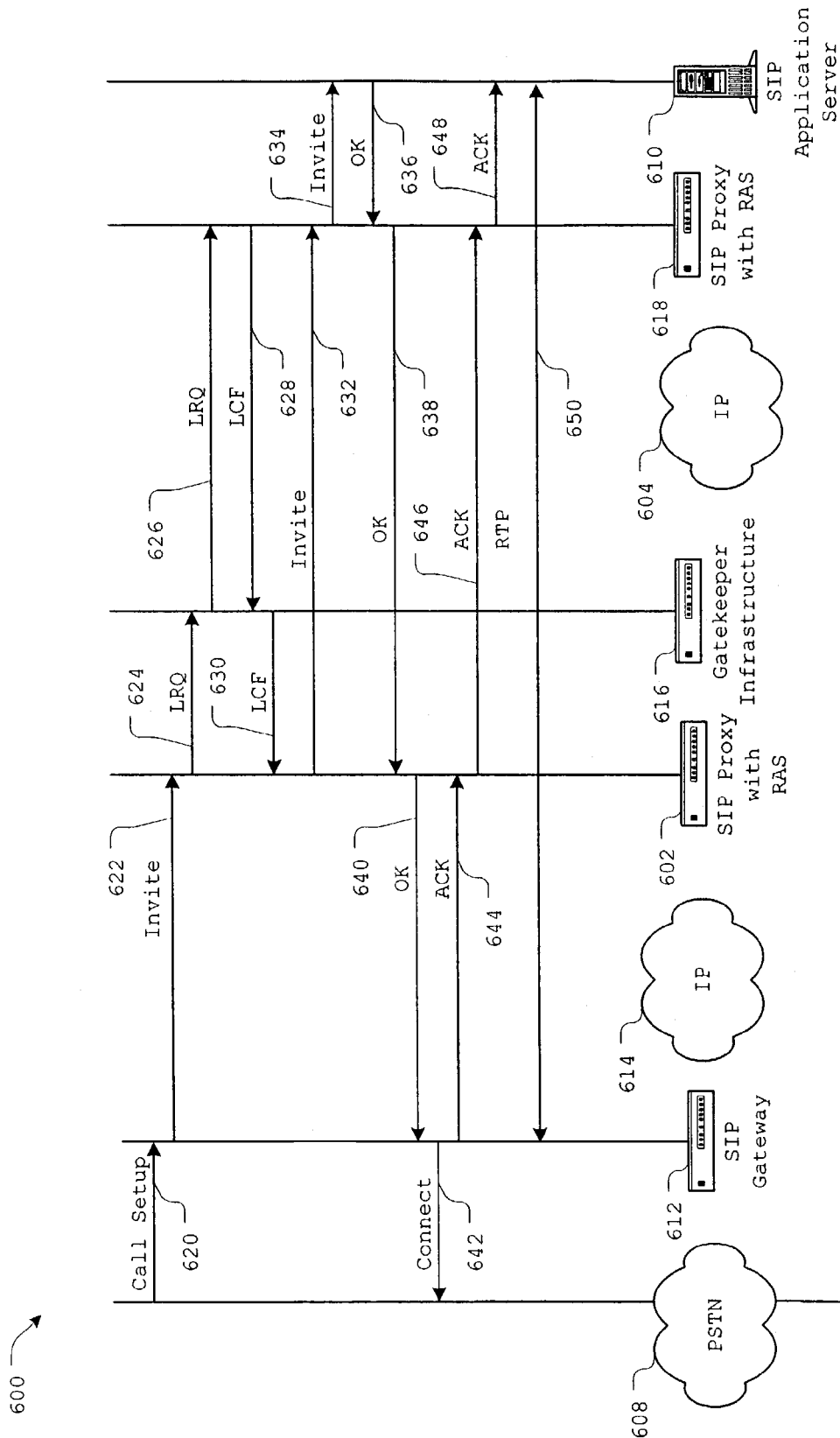

FIG. 8 shows an example of an inbound call setup process 600 using an inbound SIP proxy 602 with RAS messaging on the inbound side of a network 604. The SIP proxy 602 can use RAS messages to find an endpoint using H.323 structure and can receive RAS messages from H.323 structure and return to SIP functioning as a proxy to SIP structure.

Generally, in the inbound call setup process 600, a telephone 606 (or any device capable of communicating with a PSTN 608) places a call through a PSTN 608 to a SIP application server 610 or to a SIP Voice over IP (VoIP) gateway 612 connecting the PSTN 608 to another network 614 (e.g., another PSTN, an IP network, or other similar network) via SIP. In this example, the telephone 606 places a call from the PSTN 608 to the SIP VoIP gateway 612. The call is routed to the SIP application server 610 through the other network 614, the inbound SIP proxy 602, gatekeeper infrastructure 616 included between the inbound SIP proxy 602 and the network 604, the network 604, and a SIP proxy 618 that supports RAS.

As in FIG. 7, call setup signals transmitted between elements shown in FIG. 8 are shown in chronological order from top (earliest signal) to bottom (latest signal). Each signal's directional arrow indicates the start and end points of each signal.

The example inbound call setup process 600 begins with the telephone 606 signaling the PSTN 608 that it desires to establish a call with the SIP application server 610. To initiate the call setup between the telephone 606 and the SIP application server 610, the PSTN 608 transmits a call setup signal 620 to the SIP VoIP gateway 612. The call setup signal 620 indicates to the SIP VoIP gateway 612 that the PSTN 608 (or the telephone 606) wants to establish a call with the SIP application server 610. The SIP VoIP gateway 612 sends a SIP invite signal 622 across the other network 614 to the inbound SIP proxy 602.

The inbound SIP proxy 602 sends an LRQ signal 624 to the gatekeeper infrastructure 616 to try to resolve the address of the call's destination, the SIP application server 610. As explained above with reference to FIG. 7 and the network proxy 510, the inbound SIP proxy 602 may resolve the destination's address in other ways.

The gatekeeper infrastructure 616 forwards a second LRQ signal 626 (which may be identical to or slightly modified from the LRQ signal 624) across the network 604 to the SIP proxy 618. The SIP proxy 618 responds to the gatekeeper infrastructure 616 with an LCF signal 628. The gatekeeper infrastructure 616 transmits a second LCF signal 630 (which may be identical to or slightly modified from the LRQ signal 624) to the inbound SIP proxy. If the SIP proxy 618 could not accept the call for whatever reason, the SIP proxy 618 would not send the LCF signal 628 but a call refusal signal such as an LRJ signal. The gatekeeper infrastructure 616 would then transmit a call refusal signal to the inbound SIP proxy 602.

Now knowing address information for the call's endpoint, the SIP application server 610, the inbound SIP proxy 602 sends a second invite signal 632 (which may be identical to or slightly modified from the invite signal 622) to the SIP proxy 618. The SIP proxy 618 transmits a third invite signal 634 (which may be identical to or slightly modified from the second invite signal 632) to the SIP application server 610. If the SIP application server 610 can accept the call invitation, the SIP application server 610 sends an OK signal 636 back to the SIP proxy 636. The SIP proxy 636 transmits an identical or slightly modified OK signal 638 to the inbound SIP proxy 602, which transmits an identical or slightly modified third OK signal 640 to the SIP VoIP gateway 612. The SIP VoIP gateway 612 transmits a connect signal 642 to the PSTN 608 indicating that a call can be established between the PSTN 642 and the SIP application server 610.

Once the SIP VoIP gateway 612 receives acknowledgement that the SIP application server 610 can be one of the call's endpoints, then the SIP VoIP gateway 612 acknowledges the call setup by sending an ACK signal 644 to the inbound SIP proxy 602. The inbound SIP proxy 602 sends a second ACK signal 646 (identical or slightly modified from the ACK signal 644) to the SIP proxy 618, which sends a third ACK signal 648 (identical or slightly modified from the second ACK signal 646) to the SIP application server 610. Once the call is acknowledged between the call's endpoints, the SIP VoIP gateway 612 and the SIP application server 610 can communicate in an RTP communication session 650.

Instead of completing a call setup using the direct network proxy option (e.g., the direct network proxying process 500 of FIG. 7, the inbound call setup process 600 of FIG. 8, or other similar process), a SIP proxy with RAS capabilities may use a redirect network proxy option.

Figure 9:
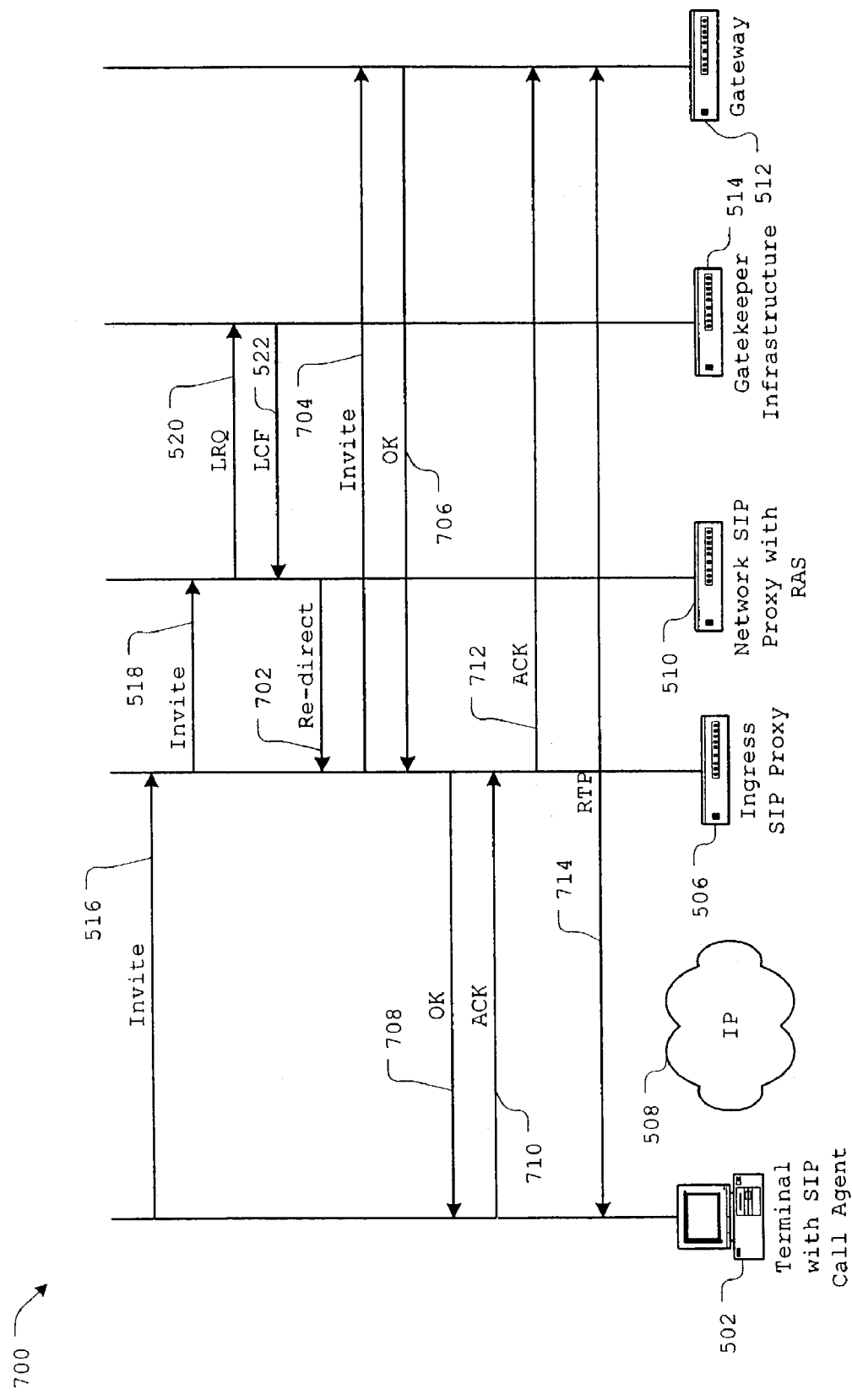
FIG. 9 shows an example of a call setup using a redirect network proxy.

Referring to FIG. 9, an example of a redirect network proxying process 700 is shown. For ease of explanation, the terminal 502, ingress proxy 506, the network 508, the network proxy 510, the gatekeeper infrastructure 514, and the gateway 512 are shown as the same elements as those discussed above with reference to FIG. 7.

Generally, in this example redirect network proxying process 700, a call is set up between the terminal 502 and the gateway 512 using the SIP network proxy 510. The SIP network proxy 510 resolves the IP address of the gateway 512 using RAS against the H.323 gatekeeper infrastructure 514. Once the SIP network proxy 510 resolves the IP address of the gateway 512, the SIP network proxy 510 instructs, through the IP network 508, the ingress SIP proxy 506 located between the terminal 502 and the SIP network proxy 510 to send a call invite request to the correct call endpoint, the gateway 512. The ingress SIP proxy 506 may then complete the call setup. Once the call is set up, information may flow between the terminal 502 and the gateway 512. There is no H.225 or H.245 signaling involved in setting up this call.

Call setup signals transmitted between elements shown in FIG. 9 are shown in chronological order from top (earliest signal) to bottom (latest signal). Each signal's directional arrow indicates the start and end points of each signal.

The example redirect network proxying process 700 begins similar to the example direct network proxying process 500 (see FIG. 7). The invite signal 516, the second invite signal 518, the LRQ signal 520, and the LCF signal 522 are sent as described.

Then, instead of the network proxy 510 sending the third invite signal 524 to the gateway 512 after determining the IP address of the terminating gateway 512 as in the example direct network proxying process 500, the network proxy 510 sends a re-direct signal 702 to the ingress SIP proxy 506. The re-direct signal 702 indicates where the ingress SIP proxy 506 should forward a second invite signal 704 (similar to the second invite signal 518 and/or the third invite signal 524 in FIG. 7). For example, the re-direct signal 702 may include location information such as in a "302 moved temporarily" message.

Once the ingress SIP proxy 506 receives the re-direct signal 702, the call setup proceeds similar to that described for FIG. 7 starting with the customer SIP proxy sending the third invite signal 704 (akin to a third invite signal 524 in FIG. 7). The redirect network proxying process 700 continues with the appropriate elements sending signals similar to like-named signals in FIG. 7. Such signals include a first OK signal 706, a second OK signal 708, a first ACK signal 710, and a second ACK signal 712. Once the call is setup, the SIP call agent 702 and the gateway 704 can communicate information in an RTP communication session 714.

The direct network proxying process 500 of FIG. 7, the inbound call setup process 600 of FIG. 8, and the redirect network proxying process 700 of FIG. 9 are each shown using elements similar to those described with reference to the network configuration 200 (see FIG. 3), but similar processes could be performed in another network configuration with other, similar elements.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. An apparatus comprising:
a proxy device configured to support a first protocol for initiation, maintenance, and termination of a communication session between call endpoints, and to support a second protocol for resolving endpoint addresses for the communication session, wherein the proxy device resolves an endpoint address of an endpoint in an egress network in response to receiving a call setup request from a first endpoint in a first network, wherein the call setup request is received via an ingress gatekeeper in an ingress network;
a directory gatekeeper configured to receive a location request message from the proxy device, the location request message requesting address information related to the endpoint in the egress network, the directory gatekeeper further configured to request the address information from an egress gatekeeper in the egress network and return the address information to the proxy device, wherein the directory gatekeeper and the proxy device are located in a call routing infrastructure between the ingress network and the egress network, and
wherein the egress gatekeeper is associated with a technology prefix that is used to indicate that the egress gatekeeper is the particular egress gatekeeper to be used to complete the call.

2. The apparatus of claim 1 in which the first protocol comprises a session initiation protocol.

3. The apparatus of claim 1 in which the second protocol comprises a registration, admission, and status protocol.

4. The apparatus of claim 1 in which the communication session is for a call complying with an International Telecommunications Union (ITU) multimedia information protocol.

5. The apparatus of claim 4 in which the ITU multimedia information protocol comprises an H.323 protocol.

6. The apparatus of claim 1 in which the communication session is for a call complying with a session initiation protocol.

7. The apparatus of claim 1 in which the proxy device is also configured to route a call between endpoints by determining which one of a plurality of gateways should be selected as an endpoint for the call.

8. The apparatus of claim 7 in which the gateways can respond to H.323 calls and session initiation protocol calls on a call by call basis.

9. The apparatus of claim 1 in which the proxy device is configured to route a voice over Internet Protocol (VoIP) call between endpoints.

10. The apparatus of claim 1 in which one of the call endpoints comprises a first endpoint included in a first network and a second one of the call endpoints comprises a second endpoint included in a second network, the device included in a third network and configured to route a call between the first endpoint and the second endpoint.

11. The apparatus of claim 1 wherein the call setup request identifies a dialed telephone number that is translated to include the technology prefix associated with the egress gatekeeper to indicate to the directory gatekeeper that the associated egress gatekeeper should be used to complete the call.

12. The apparatus of claim 1 wherein the call setup request identifies a dialed telephone number that is translated to include another technology prefix associated with a capability of a gateway, and wherein the gateway is selected based on the technology prefix included in the translated telephone number.

13. A system comprising:
a proxy device configured to route calls using an International Telecommunications Union (ITU) multimedia information protocol and calls using a first protocol for initiation, maintenance, and termination of a communication session between endpoints using a second protocol for initiation, maintenance, and termination of a communication session and a third protocol for resolving endpoint addresses for the communication session, wherein the proxy device resolves an endpoint address of an endpoint in an egress network in response to a receiving a call setup request from a first endpoint in a first network, wherein the call setup request is received via an ingress gatekeeper in an ingress network;

a directory gatekeeper configured to receive a location request message from the proxy device, the location request message requesting address information related to the endpoint in the egress network, the directory gatekeeper further configured to request the address information from an egress gatekeeper in the egress network and return the address information to the proxy device, wherein the directory gatekeeper and the proxy device are location in a call routing infrastructure between the ingress network and the egress network, and wherein the egress gatekeeper is associated with a technology prefix that is used to indicate that the egress gatekeeper is the particular egress gatekeeper to be used to complete the call.

14. The system of claim 13 in which the first protocol comprises a session initiation protocol.

15. The system of claim 13 in which the second protocol comprises an H.323 protocol.

16. The system of claim 13 in which the third protocol comprises a registration, admission, and status protocol.

17. The system of claim 13 further comprising a first endpoint included in a first network and a second endpoint included in a second network, the proxy device included in a third network and configured to route a call between the first endpoint and the second endpoint.

18. The system of claim 13 further comprising an ingress proxy configured to use the first protocol and configured to receive a call request and send the call request to the proxy device.

19. The system of claim 13 further comprising an egress gatekeeper configured to determine address information for an endpoint and send the address information to the proxy device which can use the address information in routing calls between the endpoints.

20. The system of claim 13 further comprising a gateway configured to be an endpoint and to be responsive to calls using the first protocol and calls using the third protocol.

21. The system of claim 13 in which the proxy device is configured to route a voice over Internet Protocol (VoIP) call between endpoints.

22. A method for routing calls through a communication network that includes an ingress network providing ingress into the communication network, a call routing infrastructure providing routing through the communication network, and an egress network providing egress out of the communication network, the method comprising:

receiving a call setup message from a first call endpoint at an ingress gatekeeper included in the ingress network, wherein the call setup message identifies a dialed telephone number;

forwarding the call setup message from the ingress gatekeeper to a device included in the call routing infrastructure, the device capable of handling session initiation protocol (SIP) call setup messages and handling registration, admission, and status (RAS) messages;

sending a RAS message from the device to a directory gatekeeper included in the call routing infrastructure, the directory gatekeeper capable of handling RAS messages;

receiving at the device from the directory gatekeeper RAS address information for a second call endpoint in the egress network;

translating the dialed telephone number by including a technology prefix in the telephone number, wherein the technology prefix is associated with a particular egress gatekeeper in the egress network to be used to complete a call; and setting up the call between the first call endpoint and the second call endpoint.

23. The method of claim 22 further comprising setting up an International Telecommunications Union (ITU) multimedia information protocol call between the first call endpoint and the second call endpoint.

24. The method of claim 23 in which the ITU multimedia information protocol comprises an H.323 protocol.

25. The method of claim 22 wherein setting up the call comprises setting up a SIP call between the first call endpoint and the second call endpoint.

26. The method of claim 22 further comprising setting up the call by forwarding the call setup message from the device to the second call endpoint in the egress network using the RAS address information.

27. The method of claim 22 further comprising setting up the call by redirecting the call setup message from the device to the ingress gatekeeper and sending the call setup message from the ingress gatekeeper to the second call endpoint.

28. The method of claim 22 further comprising enabling communication between the first call endpoint and the second call endpoint in a real-time transport protocol (RTP) communication session.

29. The method of claim 22 further comprising sending the call setup message to the ingress gatekeeper from an endpoint capable of communication using an International Telecommunications Union (ITU) multimedia information protocol.

30. The method of claim 22 further comprising sending the call setup message to the ingress gatekeeper from an endpoint capable of communicating using SIP.

31. The method of claim 22 wherein translating the telephone number further comprises including a technology prefix in the telephone number to determine the address information for the second call endpoint, wherein the technology prefix distinguishes the second call endpoint as having a particular capability.

32. An article comprising a machine-readable medium which contains machine-executable instructions, the instructions causing a device to:

receive a session initiation protocol (SIP) call setup message from a first call endpoint via an ingress gatekeeper included in an ingress network, wherein the device is included in a call routing infrastructure, and wherein the call setup message identifies a dialed telephone number;

generate a registration, admission, and status (RAS) message based on the SIP call setup message;

send the generated RAS message from the device to a directory gatekeeper included in the call routing infrastructure;

receive at the device from the directory gatekeeper RAS address information for a second call endpoint in the egress network;

translate the dialed telephone number by including a technology prefix in the telephone number, wherein the technology prefix is associated with a particular egress gatekeeper in the egress network to be used to complete a call; and cause a call to be set up between the first call endpoint and the second call endpoint.

33. The article of claim 32 further causing the device to set up an International Telecommunications Union (ITU) multimedia information protocol call between the first call endpoint and the second call endpoint.

34. The article of claim 33 in which the ITU multimedia information protocol comprises an H.323 protocol.

35. The article of claim 32 further causing the device to set up a SIP call between the first call endpoint and the second call endpoint.

36. The article of claim 32 further causing the device to enable communication between the first call endpoint and the second call endpoint in a real-time transport protocol (RTP) communication session.

37. The article of claim 32 further causing the device to use a technology prefix to determine the address information for the second call endpoint, wherein the technology prefix distinguishes the second call endpoint as having a particular capability.

38. A network configuration comprising:
a session initiation protocol (SIP) device configured to use a registration, admission, and status (RAS) protocol in routing a call across multiple protocols and between a first endpoint in a first network and a second endpoint in an egress network, based on a SIP call request message received from the first endpoint via an ingress gatekeeper in an ingress network;
a directory gatekeeper configured to receive a RAS request message from the SIP device, the RAS request message requesting address information related to the second endpoint, the directory gatekeeper further configured to use a particular egress gatekeeper from among a plurality of egress gatekeepers in the egress network based on a technology prefix associated with the egress gatekeeper, the directory gatekeeper further configured to request the address information from the egress gatekeeper in the egress network and return the address information to the SIP device,
wherein the SIP device and the directory gatekeeper are located in a call routing infrastructure.

39. The network configuration of claim 38 in which the device is also configured to route SiP calls between two endpoints included in two different networks.

40. The network configuration of claim 38 in which the device is included in a network different from the networks including the endpoints.

41. The network configuration of claim 38 in which at least one of the two different networks includes an Internet Protocol network.

42. The network configuration of claim 38 in which at least one of the two different networks includes a public switched telephone network.

43. A system comprising:
a proxy device configured to route calls using an International Telecommunications Union (ITU) multimedia information protocol and calls using a first protocol for initiation, maintenance, and termination of a communication session between endpoints using a second protocol for initiation, maintenance, and termination of a communication session and a third protocol for resolving endpoint addresses for the communication session and configured to redirect call messages, wherein the proxy device resolves one endpoint address by sending a request to a gatekeeper in an end network, and wherein the endpoint is selected using a technology prefix that distinguishes the endpoint as having one or more capabilities, and wherein the technology prefix is added to dialed telephone numbers associated with the calls; and
a second proxy device configured to receive redirected call messages from the proxy device and to route redirected calls using an International Telecommunications Union (ITU) multimedia information protocol and calls using a first protocol for initiation, maintenance, and termination of a communication session between endpoints using a second protocol for initiation, maintenance, and termination of a communication session and a third protocol for resolving endpoint addresses for the communication session.

44. The system of claim 43 in which the first protocol comprises a session initiation protocol.

45. The system of claim 43 in which the second protocol comprises an H.323protocol.

46. The system of claim 43 in which the third protocol comprises a registration, admission, and status protocol.

47. The system of claim 43 further comprising a gateway configured to be an endpoint and to be responsive to calls using the first protocol and calls using the third protocol.

* * * * *

UNITED STATES PATENT AND TRADEMARK OFFICE
CERTIFICATE OF CORRECTION

PATENT NO. : 7,363,381 B2  Page 1 of 1
APPLICATION NO. : 10/339082
DATED : April 22, 2008
INVENTOR(S) : Harry E. Mussman et al.

It is certified that error appears in the above-identified patent and that said Letters Patent is hereby corrected as shown below:

Page 2, column 2, line 20, delete "Vo1P" and insert --VoIP-- therefor.

In column 13, line 10, claim 13, delete "thc" and insert --the-- therefor.

In column 15, line 43, claim 39, delete "SiP" and insert --SIP-- therefor.

In column 16, line 40, claim 45, delete "H.323protocol." and insert --H.323 protocol.-- therefor.

Signed and Sealed this

Twenty-first Day of October, 2008

JON W. DUDAS
*Director of the United States Patent and Trademark Office*